Feb. 17, 1959 W. H. D. YULE 2,874,246

ELECTRICAL RELAYS

Filed June 29, 1955 9 Sheets-Sheet 1

Inventor
W. H. D. YULE
By Robert Harding Jr.
Attorney

Inventor
W. H. D. YULE
By Robert Harding Jr.
Attorney

Feb. 17, 1959 W. H. D. YULE 2,874,246

ELECTRICAL RELAYS

Filed June 29, 1955 9 Sheets-Sheet 3

Inventor
W. H. D. YULE
By [signature]
Attorney

Inventor
W. H. D. YULE
By Robert Harding Jr.
Attorney

Feb. 17, 1959 W. H. D. YULE 2,874,246

ELECTRICAL RELAYS

Filed June 29, 1955 9 Sheets-Sheet 5

Inventor
W. H. D. YULE
By Robert Harding Jr.
Attorney

Inventor
W. H. D. YULE
By Robert Harding Jr.
Attorney

Feb. 17, 1959 W. H. D. YULE 2,874,246

ELECTRICAL RELAYS

Filed June 29, 1955 9 Sheets-Sheet 7

Inventor
W. H. D. YULE
By Robert Harding Jr.
Attorney

Inventor
W. H. D. YULE
By Robert Harding Jr.
Attorney

Inventor
W. H. D. YULE
By Robert Harding Jr.
Attorney

United States Patent Office 2,874,246
Patented Feb. 17, 1959

2,874,246

ELECTRICAL RELAYS

William Henry Drury Yule, London, England, assignor to International Standard Electric Corporation, New York, N. Y., a corporation of Delaware Application June 29, 1955, Serial No. 518,901

Claims priority, application Great Britain July 2, 1954

24 Claims. (Cl. 200—104)

This invention relates to electro-magnetic relays and to mounting arrangements suitable therefor.

One feature of the invention comprises an electromagnetic relay having a U-shaped electromagnet having a coil on each leg and positioned within a U-shaped non-magnetic frame with its base secured to the base of the frame, a contact spring pile-up or pile-ups substantially at right-angles across the outside of the electromagnet and secured to one limb of the frame, and an armature pivotally mounted in a non-magnetic housing which is positioned across the pole-faces of the electromagnet and which is detachably secured to the ends of the limbs of the frame.

Another feature of the invention comprises an electromagnetic contact-making relay comprising a frame having two spaced parallel seatings on a first one of which is mounted the fixing portion of a contact-spring pile-up with the spring-extending towards said second seating and on the second of which is mounted a comb-bar having a number of equally spaced transverse spring engagement slots in which the ends of buffer-springs engage, and an operating comb cooperating with the lever springs of said pile-up and with a member operable by the armature of the relay so as to be able to move said operating comb longitudinally whereby said operating springs can be moved relating to said buffer springs.

A further feature of the invention comprises an armature assembly unit for attachment to a relay frame comprising a substantially flat housing and a substantially flat armature one face of which has a transverse ridge near one end which is capable of acting as a rocking pivot coating with a flat surface on a fixed member forming part of the magnetic circuit of a relay and from which the said face of the armature slopes away in both longitudinal directions, means on said housing for guiding said armature between its unoperated position and its operated position, means on one face of said housing for determining the unoperated position of the armature bearing surfaces on said housing for cooperating with bearing surfaces on a relay frame, and means whereby adjustments may be made before mounting an armature assembly unit on a relay frame.

These and other features of the invention will be understood from the following description thereof read in conjunction with the drawings in which.

Figure 1:
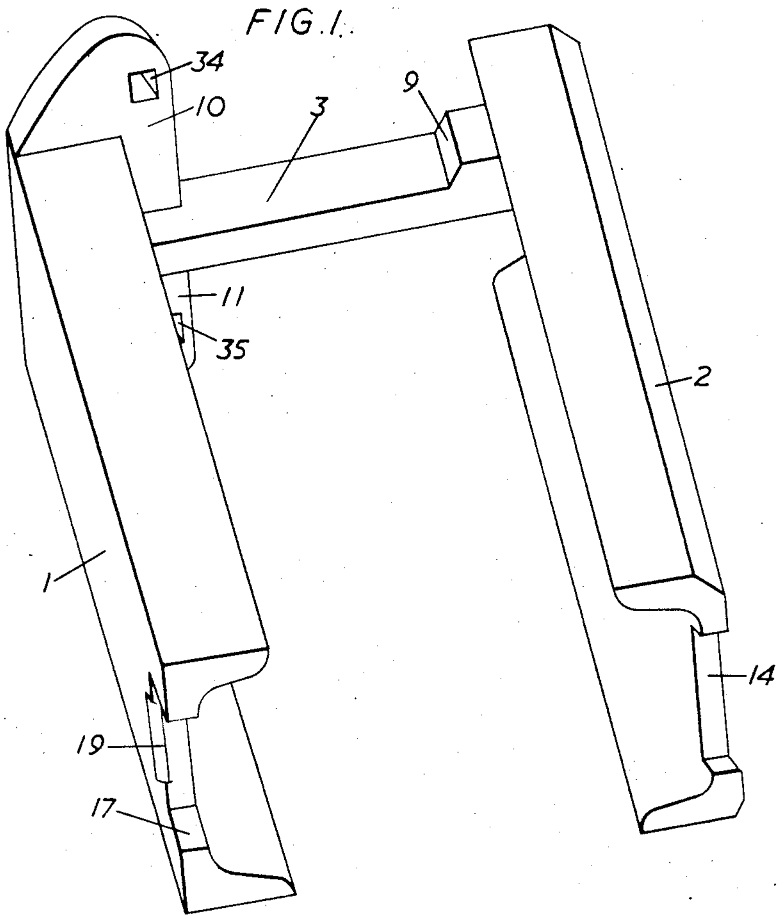
Fig. 1 is a perspective view of a relay framework according to one embodiment of the invention.
Figure 3:
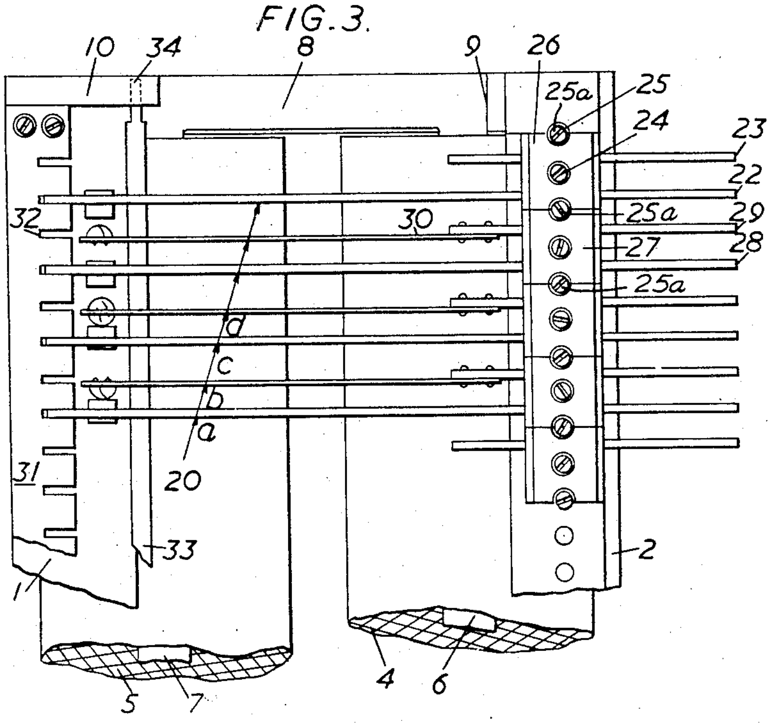
Fig. 3 is a partial plan view of the relay.
Figure 14:
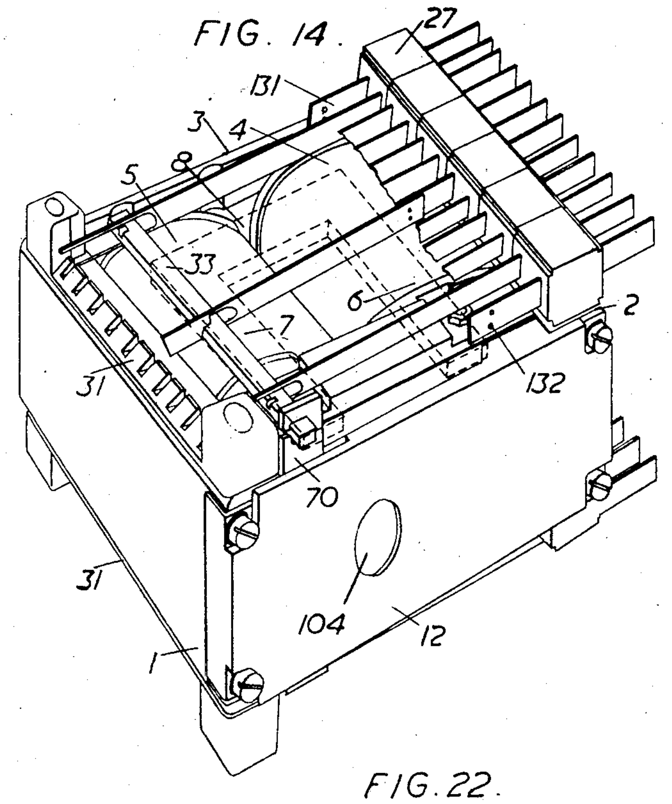
Fig. 14 is a perspective view of another relay embodying the invention, with some of its springs cut away.
Figures 15, 17:
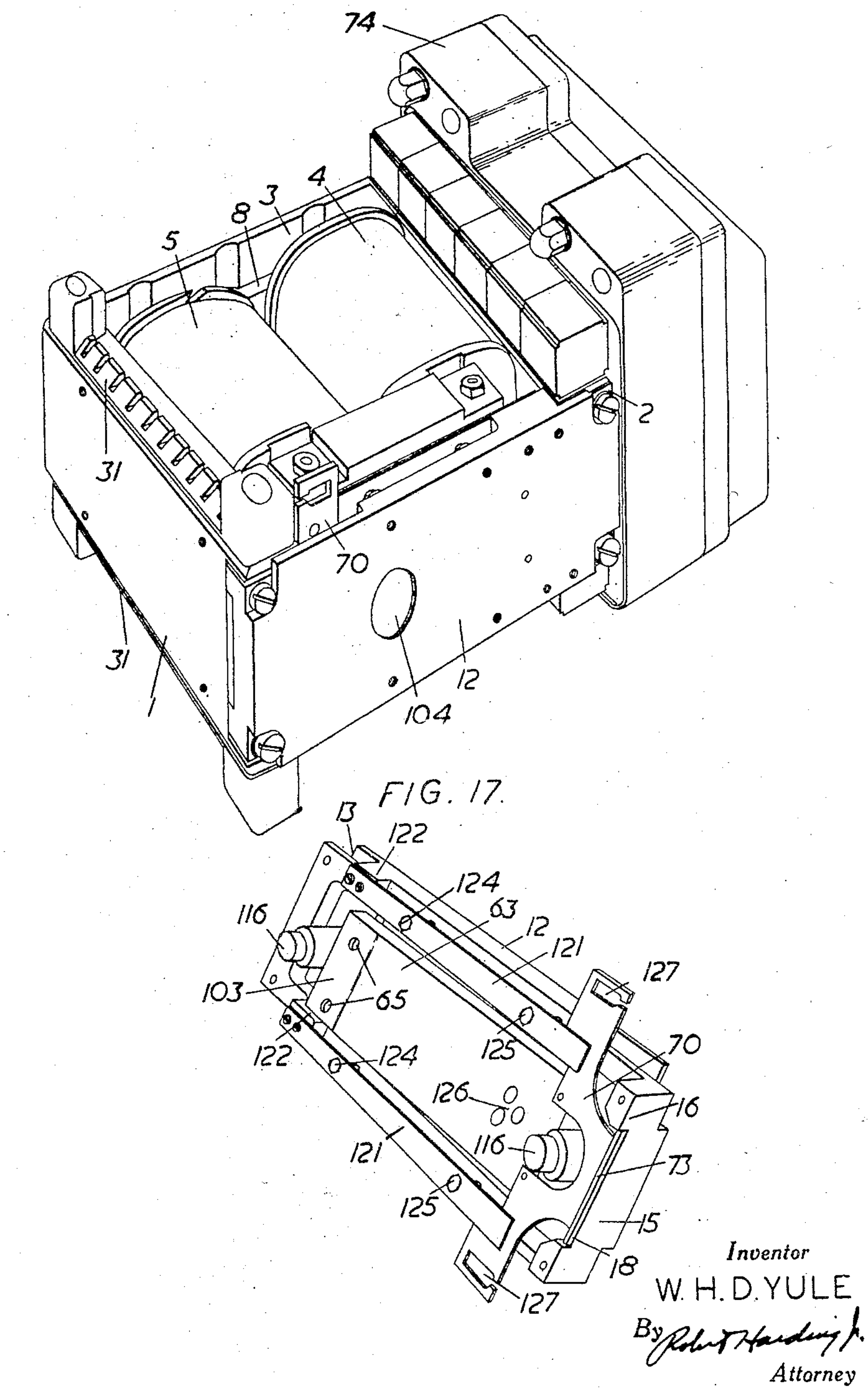
Fig. 15 is a perspective view of the relay shown in Fig. 14 mounted on a plug-in base but with its contact springs omitted.
Fig. 17 is a perspective view of another armature assembly unit, viewed from the armature side.

The general arrangement of a relay according to the invention is best seen from Figs. 14 and 15. Fig. 14 is a perspective view of a relay with some of its contact springs cut away while Fig. 15 is a perspective view of a similar relay mounted on a plug-in base but with its contact springs omitted. As shown in Fig. 1, the framework of the relay consists of a U-shaped casting having side members 1 and 2 joined together at one end by a cross member or base 3. As shown in Fig. 3, attached to the cross member 3 is a U-shaped electromagnetic yoke having side limbs or legs 6 and 7 joined together by a cross-limb 8. The limbs 6, 7 of the yoke carry coils 4, 5 and are bridged by an armature 63 (Fig. 10) mounted in a housing 12 which is attached to the free ends of the framework side members 1, 2 (Fig. 14).

Across one or both sides of the U-shaped frame and yoke assembly there are arranged parallel arrays of contact springs 22, 23 (Fig. 3). These spring pile-ups are secured in an insulated manner to the side member 2 and reach across to the side member 1 where predetermined ones are engaged by a buffer block or comb-bar 31 secured to side member 1. As will be later described, the armature 63 carries a yoke-shaped cross-plate 70 (Fig. 13) which actuates a pusher bar or bars 33. Each pusher-bar or operating comb 33 (Fig. 14) is threaded through the ends of the appropriate contact spring pile-up and, in a manner to be later described, engages and moves certain springs relative to the remainder. The ends of the contact springs remote from the pusher bar extend beyond the side member 2 and may be used for making electrical connections thereto either by direct wiring or by acting as plug blades in a plug-in base 74 (Fig. 15) attached to the side member 2.

Turning now to the embodiment shown in Figs. 1, 2, 3 and 4, the relay framework comprises a coating or moulding of non-magnetic material, having two parallel side members 1, 2 joined by cross member 3. The side members 1, 2 are shaped to conform approximately to the shape of the electro-magnetic coils 4, 5 which are mounted on a laminated U-shaped magnetic core having side limbs 6, 7 and a cross limb 8 adjustably secured to the cross-member 3. A step 9 (Fig. 1) in the cross-member 3 helps to locate the magnetic cross limb 8 on the one side while a projecting "ear" 10, on the casting, of which there are two 10 and 11 above and below the cross-member 3 respectively, helps to locate the magnetic cross-limb 8 on its other side. The purpose of the projections 10, 11 is to provide bearings 34, 35, as will be apparent later.

Figure 2:
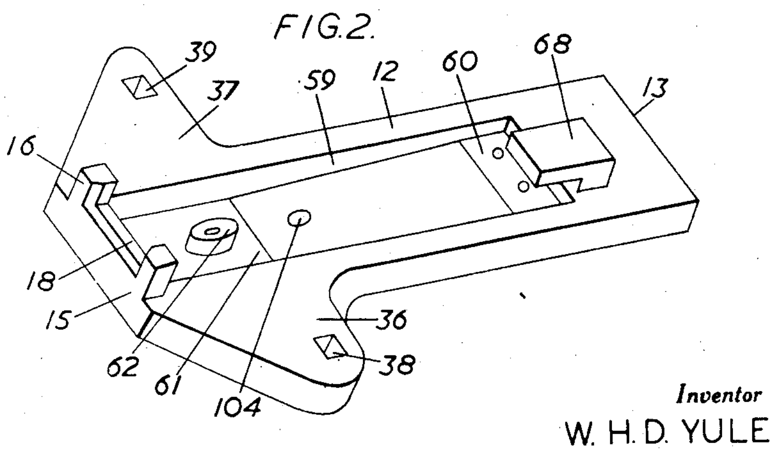
Fig. 2 is a perspective view of an armature plate for the relay.

The free ends of the side members 1, 2 are bridged by an armature plate in the form of a non-magnetic casting 12 (Fig. 2). One end 13 of the casting 12 is conveniently located and secured in a recess 14 in the free end of the side member 2. The other end 15 of the casting 12 carries a projection 16 by which it is conveniently located and secured in a recess 17 in the free end of the side member 1. Furthermore the projection 16 has a central cut-out 18, which together with the surface 19 of the recess 17 forms a chamfered aperture or window for a purpose to be later explained. The manner of locating an armature in the casting 12 will also be later explained. Furthermore the end 15 of the casting 12 is formed with projections or "ears" 36, 37, similar to projections 10, 11.

Figure 4:
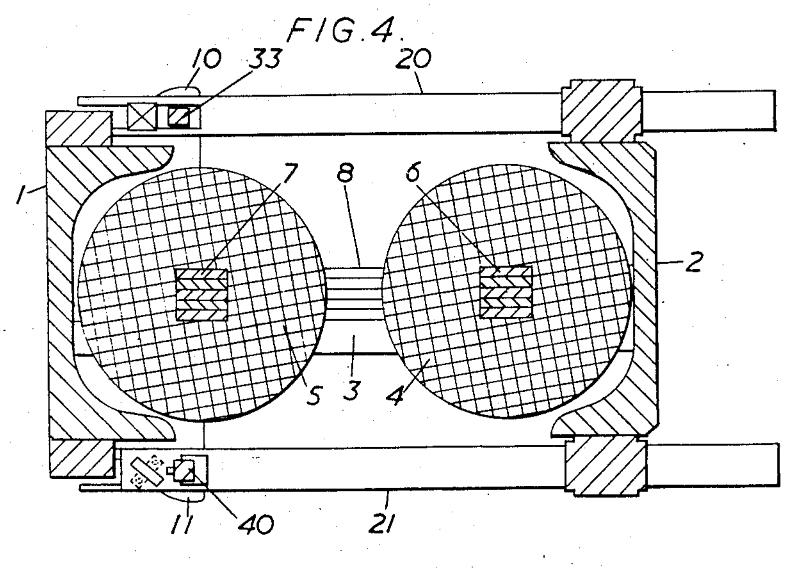
Fig. 4 is a sectional view of the relay looking away from the armature end.

As seen in Figs. 3 and 4, springs 20*a*, *b*, *c*, *d*, etc. are assembled on edge across the coils 4, 5, from side member 2, to which they are affixed in a manner to be described, to side member 1 where the movement of certain ones of the springs is restricted in a manner to be described.

Further springs 21 (Fig. 4) may be assembled across the coils on the opposite side from springs 20 in similar manner if desired.

The springs 20 or 21 are preferably mounted as detachable units each comprising two or three springs.

A unit spring pile comprising two springs may consist of one long and one short spring as will be described or may consist of two long or two short springs similar to those which will be described. Any short spring may be used in obvious manner for terminating and making connection to the relay winding or windings or, as will be described, for the attachment of a thin flexible lever spring. A long spring such as 22, Fig. 3, of sufficient thickness to act as a front or back contact or buffer spring and also to act at its non-contact end as a plug blade to make contact in a suitable jack, is moulded in insulating material side-by-side with a short spring such as 23, of similar thickness. The plug blades of all springs are thus of similar thickness.

The spacing of the springs and the quality of the insulating material are such as to be suitable for the voltage which is to be applied between adjacent springs when the relay is used but in any case the spacing is such that a hole for a counter-sunk or counter-bore screw 24 may be made or moulded between the springs 22 and 23 whereby the block of insulating material containing the springs is attached to the surface of the side member 2. Suitable moulding materials into which the springs may be moulded comprise phenolic, methacrylate, melamine or polyamide materials and a surface leakage distance of the order of 0.7 centimetre is suitable for an applied flash test of 3000 volts A. C. This distance may be increased by arranging transverse grooves across the leakage path, provided the air breakdown distance still remains adequate to withstand the applied test.

Preferably the counter-sinking for screw 24 is applied to both ends of the hole so that the block may be mounted on either face as required.

At opposite sides of the block of insulating material recesses 25, each equivalent to half of the hole of the screw 24 are formed, whereby the block of insulating material may be more rigidly held by further screws 25*a* which prevent rotation of the block about the screw 24. Blocks of insulating material each containing two springs as described are arranged side-by-side along the surface of side member 2 each having an individual screw fixing such as 24 and sharing screws 25*a* with adjacent blocks in holes 25. Thus block 26 containing springs 22 and 23 shares a screw 25*a* with block 27 containing springs 28 and 29. This provides, in effect, a three screw fixing for each unit. To the short springs, such as 29, there are rigidly attached by any suitable means such as riveting or welding and riveting, thin flexible lever springs such as 30. The length of the long springs, such as 22 and 28, is such that they enter slots in a buffer block or strip of insulating material 31 rigidly attached to the face of side member 1. There is a slot such as 32 in the strip 31 opposite every spring mounted on side member 2 but only the buffer springs are long enough to enter the slots, into which they fit with sufficient freedom to allow of suitable contact follow. The lever springs are slightly shorter so that the slots 32 opposite to them are not used. The various springs are fitted with suitable contacts as will be later described.

Figure 7:
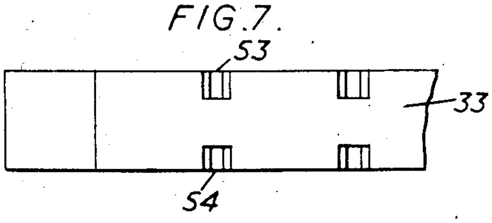
Figs. 7 and 8 are enlarged views in elevation and plan respectively of a portion of a pusher bar.
Figure 8:
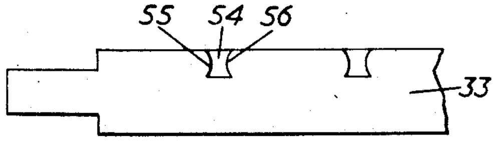

Passing transversely through all the springs 20 there is an operating or pusher bar 33 having bearings in apertures 34, 38, in projections 10 and 36 respectively. Similarly a pusher bar 40 passes through springs 21 and has bearings in apertures 35 and 39 in projections 11 and 37 respectively. Preferably each pusher bar, such as 33, comprises a rectangular rod of insulating material and passes freely through a slot in each of the buffer springs with which it is associated. In passing through the associated lever springs, however, corners in the slots of the lever springs enter slots in the corners of the pusher bar, so that when the pusher bar is moved to and fro by the armature operating arm as will be later explained, the lever springs, but not the buffer springs, follow the same motion. This can best be seen from Figs. 5 and 6 which show in greater detail the shapes of the buffer and lever springs respectively, and Figs. 7 and 8 which show the shape of the slots in a pusher bar. It will be appreciated that the shape of the pusher bar and also of the buffer block is independent of the spring contact combination with which the relay is equipped.

Figure 5:
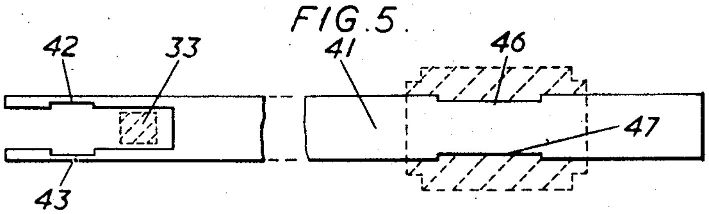
Fig. 5 is a broken view in elevation of a buffer spring.
Figure 9:
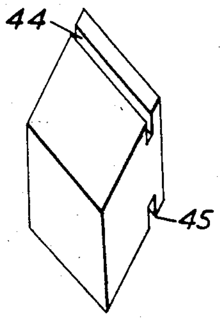
Fig. 9 is an enlarged perspective view of a contact.

In Fig. 5 the long end of a buffer spring such as 41 is slotted for a sufficient distance to allow free movement of pusher bar 33 therethrough. Furthermore, the sides of the slot are recessed as at 42, 43, to enable a carbon contact such as shown in Fig. 9, to be located and firmly gripped therebetween. Preferably the carbon contact is recessed as at 44, 45 (Fig. 9) and these recesses are metallised as by plating or tinning. The contact may then be soldered on to the spring 41 at the recesses 42, 43 in addition to being mechanically held thereby. The other end of the spring 41 is recessed as at 46, 47 to improve its anchorage in the block of insulating material. The recesses 46, 47 may be replaced by or may be in addition to a hole or holes in the spring through which the insulating material passes.

Figure 6:
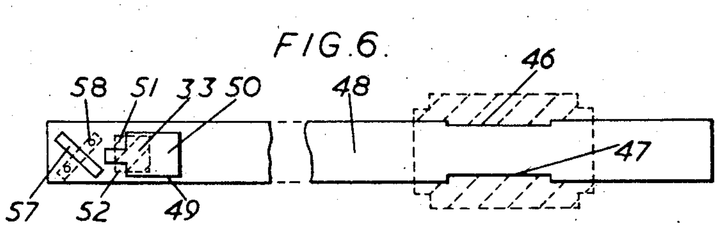
Fig. 6 is a broken view in elevation of a lever spring.

In Fig. 6, the long end of a lever spring such as 48 is pierced with a T-shaped slot 49 so positioned and dimensioned that pusher bar 33 may be threaded through the large opening 50 and then brought into engagement with corners 51, 52 which enter slots such as 53, 54 (Fig. 7) in pusher bar 33 when it is located in its bearing apertures 34, 38 (Figs. 1 and 2). These slots 53, 54 are preferably not carried right across the bar but have a central stiffening rib. Slots 53, 54, may be clearly seen in Figs. 7 and 8. Preferably the side walls 55, 56 of these slots are curved as shown in order to provide a rolling action between the pusher bars and the lever springs. Friction between bars 33, 40 and the various lever springs and also the bearing apertures 34, 35, 38, 39 may be reduced by making the bars 33, 40 from a material having an exceptionally low coefficient of friction with the materials with which it engages. Such materials comprise a halogen substituted polyethylene such as polytetrafluorethylene or polytrichlorfluorethylene or a polyamide of the nylon type. The construction of the bars lends itself to ready moulding or pressing in such materials.

Lever spring 48 is attached, as already explained, to a short spring moulded in an insulating block, which short spring is recessed as at 46, 47 for the purpose specified.

Beyond the slot 49 lever spring 48 carries one or more contacts as required, preferably bar shaped and placed at an angle as shown at 57 (Fig. 6) whereby the contact may be riveted or welded and riveted and if desired a second contact 58, on the opposite side of the spring 48 may be similarly mounted at an angle thereto so that the rivets of one contact are clear of the other.

Figure 12:
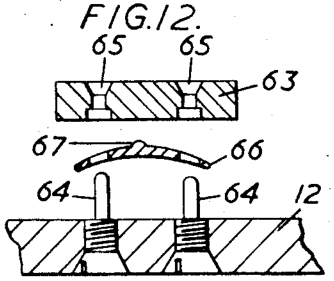
Fig. 12 is an enlarged exploded end-sectional view of the armature locating arrangements shown in Fig. 10.
Figure 10:
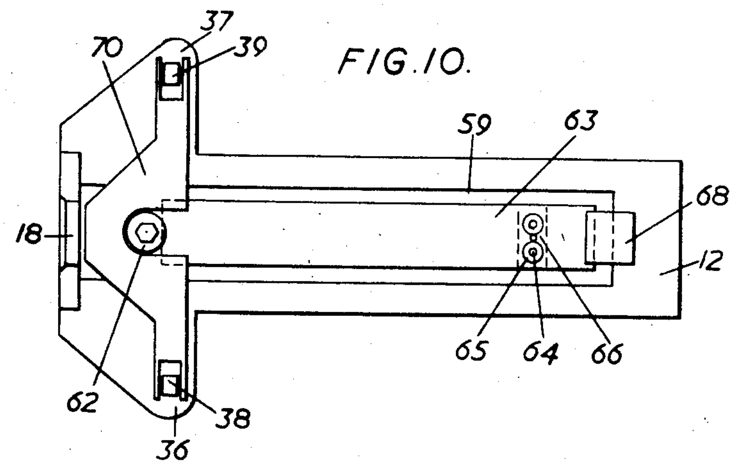
Fig. 10 is a plan view of the armature plate shown in Fig. 2 with an armature assembled thereto.
Figure 11:
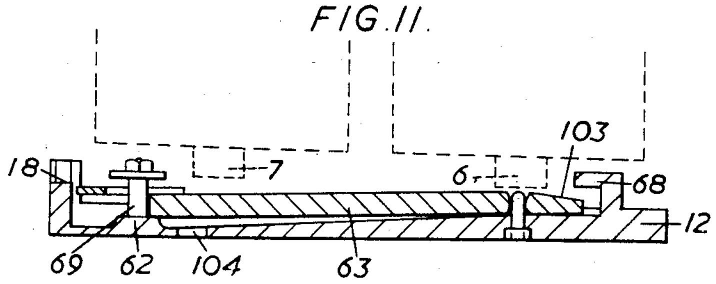
Fig. 11 is a side-sectional view of the assembly shown in Fig. 10.

Turning now to the provision and location of an armature in plate 12 (Fig. 2) which, as already explained, is attached to the side members 1 and 2 of the main framework and supports pusher bar 33 or pusher bars 33 and 40 in bearings 38 and 39 respectively, the armature plate 12 is recessed at 59 over an area including the areas which will be presented to the ends of the side limbs 6, 7 of the core when the plate 12 is assembled, as already described, to the side members 1, 2 of the relay framework. The ends 60, 61 of the bottom of the recess 59 are at different levels, the end 61 being at a lower level than the end 60 and supporting a boss 62 which, as will be seen more clearly in Fig. 11, acts as a back-stop for an armature 63 which lies in the recess 59. The armature 63, as shown in Figs. 10 and 11 and in greater detail in Fig. 12, is retained in position by two pins 64, which may conveniently be screws countersunk in the plate 12 and passing freely through holes 65 in the armature 63. In order to reduce friction and interference when the armature is attracted to the core, the holes 65 therein may be bevelled or countersunk or both. Furthermore, between the armature 63 and the plate 12, a light curvilinear spring 66 is placed over the pins 64, having a small hemispherical raised portion 67 on the pivotal line between the pins 64 so that the armature has in effect a one-point bearing thereon and is pressed against the end of the relay core both in unoperated and operated positions.

Preferably the pivotal line or fulcrum of the armature and the fulcrum of the lever springs lie in a common plane at right angles to the springs and armature, so that both lever springs and armature are substantially parallel to one another throughout their movement. Furthermore, the bevelling or countersinking of the holes 65 should be such that the armature 63 is enabled to pivot about a line on the end of the relay core. To assist this pivoting action the end of the armature is suitably chamfered as at 103 (Fig. 11).

Figure 13:
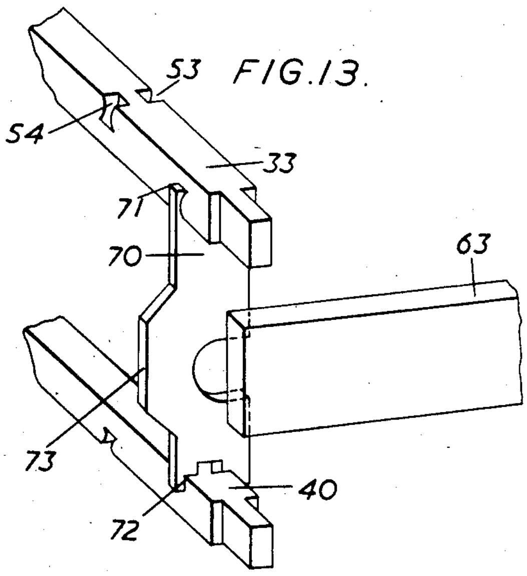
Fig. 13 is a perspective view showing how an armature cross-plate engages with the pusher-bars.

Manual operation of the relay may be arranged for by the provision of an aperture such as 104 in the armature plate 12. To prevent the armature 63 from falling off the pins 64 when the assembly is removed from the framework, the plate 12 is formed with a suitable lug 68 which slightly overlaps the end of the armature 63 and is out of register with the end of core 6 when the armature assembly is mounted on the framework 1. The operated position of the armature 63 is controlled by a member 69 which may be either a lug on the casting or, as shown in Fig. 11, a spacing tube and washer attached by a nut to a screw in the boss 62. The member 69 effectively controls the residual air gap between the core and the armature when in operated position. One or more non-magnetic discs may be welded to the operating face of the armature to act as safety stops. To the moving end of the armature 63 there is attached, by welding or screwing or other suitable means, a non-magnetic yoke-shaped cross plate 70 (Fig. 10), the ends of which, as will be seen more clearly in Fig. 13, are slotted and engage slots 71, 72 in pusher bars 33 and 40 respectively.

The side walls of slots 71, 72 are curved in similar manner to those of slots 53, 54 to provide a frictionless rolling action between the pusher bars and the cross plate 70. The centre 73 of the front end of cross plate 70 is extended as shown in Fig. 13 so as to be visible through the central cut out 18 (Fig. 2) when the relay is in operated position. The portion 73 may be suitably coloured to be more easily visible through the cut-out or window 18.

Figure 16:
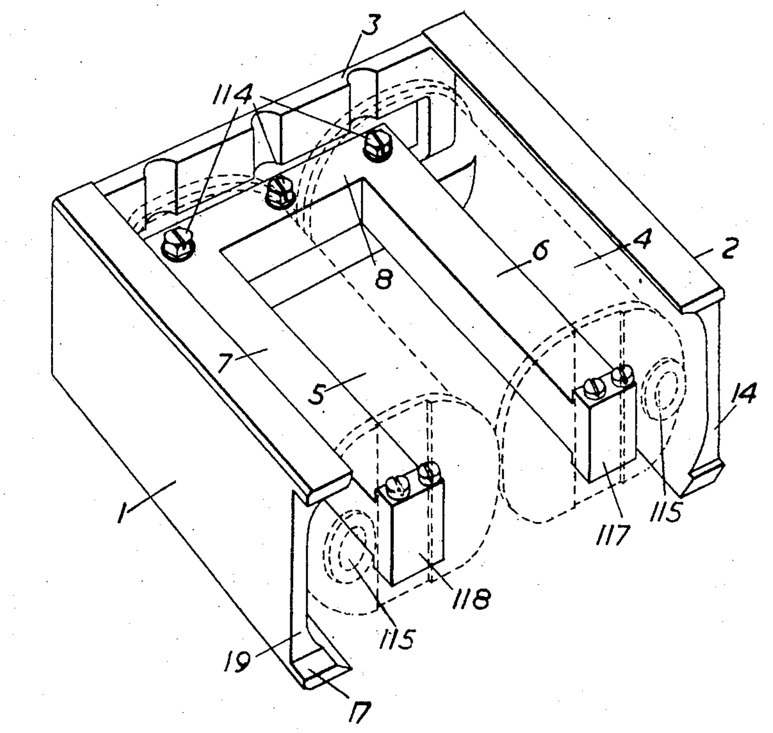
Fig. 16 is a perspective view showing the general arrangements of a relay frame and core.

In another embodiment of the invention a relay framework comprises the members 1, 2, 3 as shown in Fig. 16. It will be seen that the cross-member 3 no longer has "ears" for supporting pusher bars and that the cross-limb 8 of the core is adjustably attached thereto by screws 114. The front end of the electromagnetic assembly of core and coils is provided with holes 115 in the cheeks of the coil spools, into which projecting bosses 116 on the armature plate 12 (Fig. 17) fit when assembled thereto. This arrangement ensures a rigid electromagnetic assembly in the framework supported and secured at both ends. The two spools 4, 5 may conveniently be spring urged towards the pole pieces 117, 118 by means of a spring or springs (not shown) inserted between the rear spool cheeks and the cross-limb 8 so that any adjustment of the core made at the screws 114 has no effect on the location of the front cheeks and consequently on the engagement of the bosses 116 in holes 115.

Pole pieces 117, 118 comprise the ends of the laminated cores augmented by plates attached thereto by screws or rivets passing through the laminations to present flat pole faces of suitable size for cooperation with the armature when the relay is energized. The inner faces of the coil cheeks may be suitably channelled or cut away to provide passages or recesses for the inner and outer ends of the windings.

Figure 18:
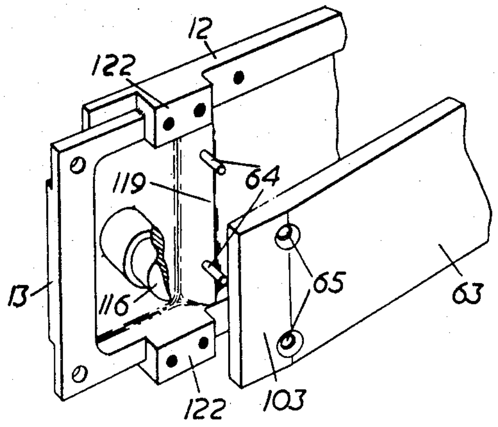
Fig. 18 is an enlarged exploded perspective view of one end of the armature assembly unit shown in Fig. 17.

The armature assembly unit shown in Fig. 17 differs from that already described in several respects. In addition to carrying the bosses 116 as already mentioned, the armature plate 12 comprises a ridge 119 (Fig. 18) into which the two pins 64 are fitted which engage in the holes 65 in the armature. The ridge 119 ensures that the armature end 103 cannot drop away more than a very short distance from its cooperating pole face when assembled thereto. This in turn restricts the amount of tilting or twisting which can occur to the armature.

Figure 19:
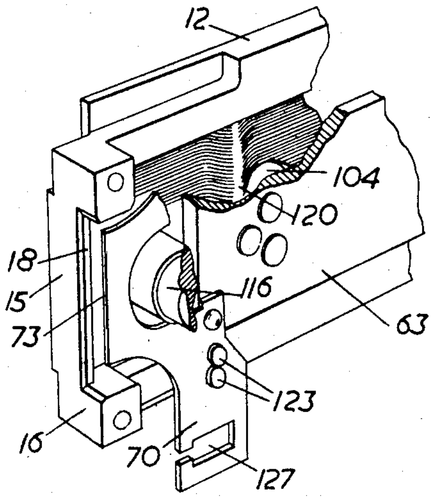
Fig. 19 is an enlarged exploded perspective view, partly broken away, of the other end of the armature assembly unit shown in Fig. 17.

The armature plate 12 comprises a further ridge 120 (Fig. 19) which acts as the armature back stop while forward movement of the armature is restricted by means of two substantially flat springs 121 (Fig. 17) attached to bosses 122 on the plate 12 and extending along the sides of the armature 63 and over the face of the cross-plate 70 attached thereto upon which they bear preferably upon moulded studs 123 (Fig. 19). The studs 123 may be made of a material, such as a halogen substituted polyethylene or a polyamide, which have a low coefficient of friction. Each spring 121, which may be laminated to reduce the working stresses therein without producing excessive build-up of pressure as the relay operates, has two adjustable screws 124, 125 passing freely through holes therein and screwed into the armature plate 12.

The head or the screw 124 which is relatively close to the spring mounting boss 122, bears on the spring 121 and determines the idle pressure to be exerted by the spring upon the cross-plate 70 and if desired the screw can be locked after adjustment in any convenient manner.

The head of the screw 125 which is relatively close to the cross-plate 70 engages with the spring 121 only at a point near the fully operated position of the armature. The actual length of spring thus engaged is much shorter than in the case of screw 124 and a considerable increase in operated pressure on the armature will result. Adjustment of this screw 125 which may be locked thereafter in any convenient manner, provides for close adjustment of the release characteristic of the relay and also tends to improve the operate/release ratio. Normally the build-up in magnetic pull as the armature approaches close to the core is much greater than the pressure build-up of a simple cantilever spring, resulting in poor releasing characteristics. This is offset to some extent by the additional load exerted by any front contact springs which may be fitted, but this is limited in scope by the necessity of providing contact follow so that if the front load is increased unduly, two-step action might take place. By means of the springs 121 and then adjustment means as already described, a relatively heavy load may be added to the armature at the most favourable point in its stroke.

The armature 63 may be provided with one or more residual stops 126 in known fashion. The cross-plate 70 carries slots 127 near its ends shaped generally like the T-shaped slot 49 in lever spring 48 (Fig. 6). These slots 127 may be either open or closed at the edge of the cross-plate.

Preferably the ridge 120 and the aperture 104 are adjacent as seen in Fig. 19 so that the aperture not only provides means for manual operation of the relay but also enables suitably shaped "go" and "no go" gauges to be inserted between the ridge 120 and the back of the armature 63 whereby the correctness of the stroke of the relay may be checked.

Figure 20:
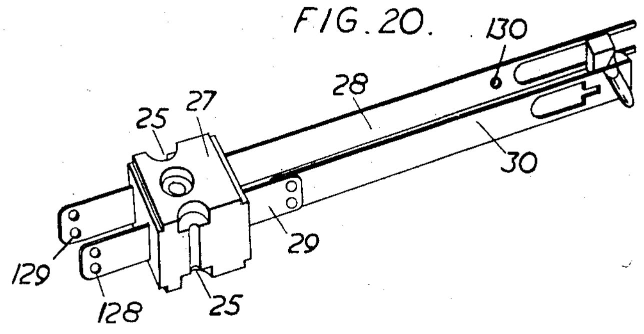
Fig. 20 is a perspective view of a spring unit using the springs shown in Figs. 5 and 6.

Turning now to the contact spring pile-up arrangements, Fig. 20 shows a block of insulating material 27 into which are moulded in a manner already described two springs of similar thickness, a long spring 28 and a short spring 29. The spacing of the springs in the block are such that when two or more blocks 27 are placed side-by-side all the springs are equidistant, one from the next. The short spring is symmetrical about its centre lines so that it is immaterial which end is used for attachment to the thin spring 30. The holes 128 and similar holes 129 in spring 28 may be used for making soldered connections to wires, if desired. Each of the long springs 28 has a hole 130 just behind its pusher-bar slot, for a purpose to be later described.

Figure 21:
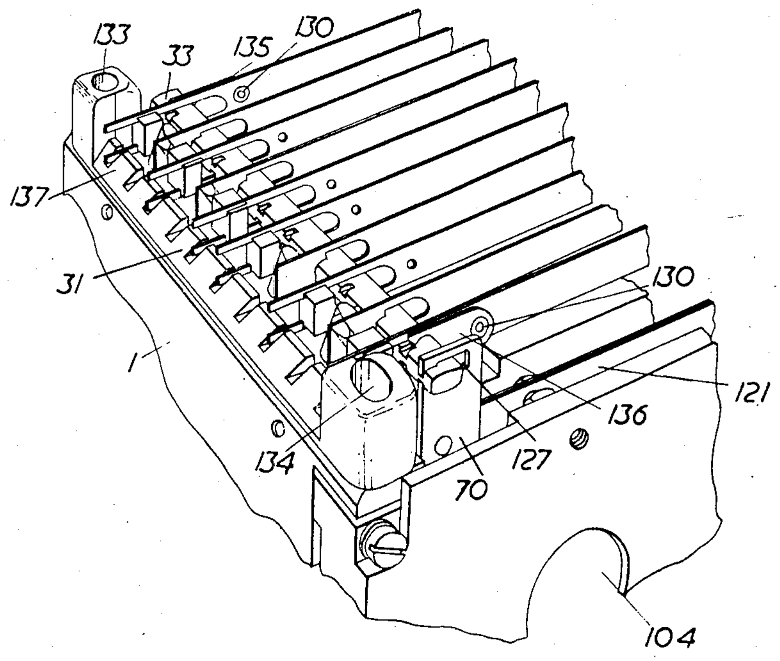
Fig. 21 is a perspective view of part of the relay shown in Fig. 15 showing the contact ends of a pile-up of contact springs.

Spring blocks 27 secured side-by-side on the relay framework as in Fig. 14 may be used to provide contact arrangements as shown for instance in Fig. 21 and also to provide two outside short springs 131, 132, (Fig. 14) to which the ends of one or both of the coils 4, 5 may be attached. In Fig. 21 the buffer block 31 is secured to the side member 1 of the relay framework by two screws shrouded in slots 133, 134 so that the block 31 may be adjusted lengthwise. Each of the buffer springs engages in the appropriate slot in the block 31. The pusher bar 33 passes through all the springs and also the slot 127 in the cross-plate 70 and is retained in its forward position, engaging all the lever springs and the cross-plate 70 in a manner already described, by means of guides 135, 136 attached to the two outer buffer springs after assembly.

These guides 135, 136 are fixed to the outer buffer springs by means of rivets or the like through the holes 130 in the springs and are so profiled as to restrict movement of the pusher bar 33, in conjunction with the corners 51, 52 (Fig. 6) of the lever springs, except in a longitudinal direction and to present relatively small bearing faces at which friction can arise. Preferably the guides are made of polyamide but any material either insulating or metal may be used. With this arrangement, when the relay is equipped with contact spring pile-ups both above and below the coils, any possible fault which holds one pusher bar in its operated position must, through the cross-plate, also retain the other pusher bar in the same position.

It will be understood that the lever springs of the relay exert negligible restoring pressure, when operated, the restoring pressure being provided by the springs 121 as already described.

It should be noted that the face 137 of the buffer block 31 is cut away or sloped so that the ends of the various contact springs may be easily seen from the front of the relay.

Figure 22:
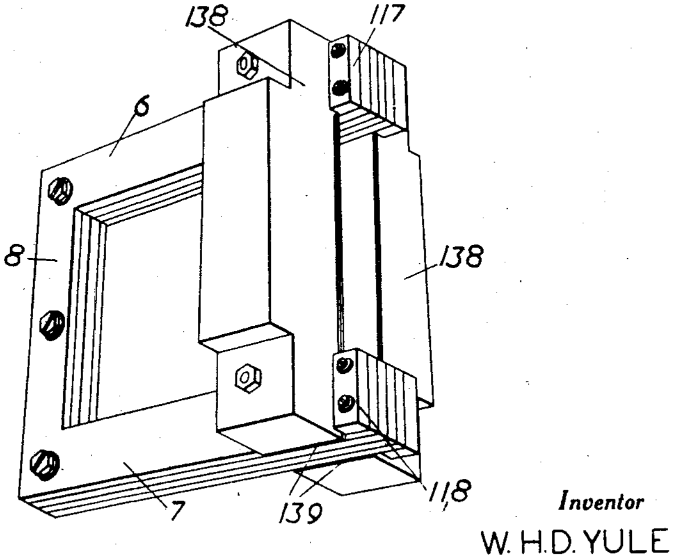
Fig. 22 is a perspective view of the core of a relay of another embodiment of the invention.

Other types of relay may be provided by suitable modifications to the embodiments described. For instance, what is commonly known as a biassed neutral relay may be produced by a modification of the electromagnetic cores as shown in Fig. 22. In this arrangement the side limbs 6, 7 are bridged at their pole pieces 117, 118 by one or more permanent magnets 138, reinforced by a soft iron shunt 139 in parallel with it, so that the relay will operate in one direction of current only in the coils. Preferably the shunt 139 is placed between the magnet 138 and the side limbs, 6, 7 of the core. As a result of the provision of a magnet or magnets the coils are shorter and the holes 115 (Fig. 16) in the spool cheeks are further away from the armature plate and from the bosses 116 (Fig. 17) which should enter them. Extension pieces may be added to the bosses 116 to overcome this difficulty. Alternatively the bosses 116 may be arranged to enter suitably placed holes in the magnet 138.

A relay having delayed action on operation a release can be provided by fitting copper slugs in place of part of the energising winding in well known manner. Such slugs or sleeves may be fitted on either or both side limbs of the core. Furthermore, the pole pieces 117, 118 may be made integral with one another, thus providing a soft iron shunt of suitable dimensions across the open end of the U core.

In order to provide an alternating current relay the pole-ends of either or both the side limbs 6, 7 may be split to accept a copper shading ring in well known manner.

Although certain embodiments of the invention have been shown and described for the purpose of illustration, it will be understood that modifications and adaptations thereof occurring to those skilled in the art may be made without separating from the scope of the invention as defined in the appended claims.

While the principles of the invention have been described above in connection with specific embodiments, and particular modifications thereof it is to be clearly understood that this description is made only by way of example and not as a limitation on the scope of the invention.

What we claim is:

1. An electromagnetic relay having a U-shaped electromagnet having a coil on each leg and positioned within a U-shaped non-magnetic frame with its base secured to the base of the frame, contact spring pile-up means substantially at right-angles to the axes of said coils and disposed across the outside of said electromagnet and secured to a first limb of said frame, an armature pivotally mounted in a non-magnetic housing which is positioned across the pole-faces of the electromagnet and which is detachably secured to the ends of the limbs of the frame, and means coupling said armature with said pile-up means.

2. An electromagnetic relay as claimed in claim 1, wherein said contact spring spring pile-up comprises movable springs and fixed springs, said fixed springs having a length longer than said movable springs, means for retaining said fixed springs in fixed position, said retaining means mounted on a second limb of said frame, said second limb opposite said first limb.

3. An electromagnetic relay as claimed in claim 1 wherein said housing is substantially flat and said armature is substantially flat, one face of said armature having a transverse ridge near one end which is capable of acting as a rocking pivot coacting with the pole faces of said electromagnet, the face of said armature sloping away in both longitudinal directions from said pole faces, and means on said housing for guiding said armature between its unoperated position and its operated position.

4. An electromagnetic relay as claimed in claim 1, and in which the electro-magnet is supported at its end remote from the base of the frame by engagement with the armature housing.

5. An electromagnetic relay as claimed in claim 4 in which the armature is substantially in line with the coils, said coupling means comprising a cross-plate carried by said armature extending above and below the coils which engages with contact pusher bar means through which movement is imparted to the lever springs of the contact spring pile-up means.

6. An electromagnetic relay as claimed in claim 5, wherein said contact spring pile-up means comprises a pair of groups of spring pile ups, each group spaced from the other, said coils positioned in the space between said groups.

7. An electromagnetic relay as claimed in claim 5 in which the armature is biassed to its unoperated position by adjustable biassing spring means mounted on the armature housing and pressing on the armature or cross-plate.

8. An electromagnetic relay as claimed in claim 7 and in which the lever springs are substantially unbiassed and are pulled to their unoperated positions by the force exerted by the armature biassing springs.

9. An electromagnetic relay as claimed in claim 8 and in which the armature housing and the non-magnetic frame cooperate to provide an aperture in alignment with the end of the armature cross-plate in either its operated or un-operated position.

10. An electromagnetic relay as claimed in claim 9 and in which the unoperated position of the armature is determined by a ridge or projection on the face of the armature housing against which the armature is pressed by its biassing springs in unoperated condition.

11. An electromagnetic relay as claimed in claim 10 and in which the armature housing is provided with an aperture through which the armature may be manually operated and through which the movement of the armature from said ridge or projection may be gauged.

12. An electromagnetic relay as claimed in claim 6, wherein said pusher bar means comprises a separate pusher bar for each of said groups of springs, each bar passing through all the springs in the appropriate contact spring pile-up group and through the cross-plate and is held in engagement with the cross-plate and the lever springs in said pile-up by guides attached to the outermost springs of the respective pile-up.

13. An electromagnetic relay as claimed in claim 12 and in which each pusher bar passes through all the springs in its associated contact spring pile-up group and is held in engagement with the lever springs in said pile-up group and with the cross-plate by bearings in the relay frame and the armature housing.

14. An electromagnetic relay as claimed in claim 6 and in which the ends of the springs in each of the contact spring pile-up groups form plugs whereby the relay may be plug-connected to a jack.

15. An electromagnetic relay as claimed in claim 1 and in which the poles of the electro-magnet are bridged by a permanent magnet and by a soft iron shunt.

16. An electromagnetic relay armature assembly as claimed in claim 5 in which said means for determining the unoperated position of the armature comprises a projection on said face of the housing, and said adjusting means comprises spring means mounted on said face and tensioned to press on said armature and having adjustable front and back stops secured in said plate for respectively limiting said pressure of the spring means on the armature in unoperated position and increasing the pressure of said spring means in operated position.

17. An electromagnetic relay armature assembly as claimed in claim 16 and comprising an aperture in said plate adjacent said means for determining the unoperated position of the armature whereby the distance between said means and one face of the armature when in operated position may be determined.

18. An electromagnetic relay as claimed in claim 1, wherein the core is formed of U-shaped lamination and wherein polar extensions are applied on the side faces of both outer laminations of each magnet pole so as to form an enlarged plane pole face and are fixed thereto by fastening means.

19. An electromagnetic relay armature assembly as claimed in claim 3 and in which said guiding means between the unoperated and operated positions of the armature comprises two pins passing through holes in the armature in the line of said transverse ridge.

20. An electromagnetic relay armature assembly as claimed in claim 19 and in which the armature is spring-urged away from said face of the housing at the line of said transverse ridge.

21. An electromagnetic relay armature assembly as claimed in claim 19 and in which the end of the armature remote from the transverse ridge carries a cross-plate for engagement with contact spring pusher bar or bars.

22. An electromagnetic relay armature assembly as claimed in claim 1 and in which the housing comprises projections capable of coacting with a member or members forming part of the electromagnet of a relay whereby movement of one end of the electromagnet is restricted.

23. An electromagnetic relay armature assembly as claimed in claim 22 and comprising a recess between said bearing surfaces on the housing substantially in line with the end of the armature when in its operated position.

24. An electromagnetic relay as claimed in claim 2, wherein said means for coupling said armature to said pile-up means comprises an operating comb which extends parallel to said second limb and transversely across said fixed springs and said movable springs adjacent the portions thereof nearest said second limb, said comb engaging said movable springs only.

References Cited in the file of this patent

UNITED STATES PATENTS

| | | |
|---|---|---|
| 629,645 | Baynard | July 25, 1899 |
| 1,639,901 | Sampson | Aug. 23, 1927 |
| 2,021,199 | Pearce | Nov. 19, 1935 |
| 2,026,344 | Hollopeter | Dec. 31, 1935 |
| 2,064,998 | Waite | Dec. 22, 1936 |
| 2,069,162 | Hailes | Jan. 26, 1937 |
| 2,178,289 | Snavely | Oct. 31, 1939 |
| 2,254,720 | Wilcox | Sept. 2, 1941 |
| 2,327,549 | Peek | Aug. 24, 1943 |
| 2,332,483 | Doty | Oct. 19, 1943 |
| 2,446,232 | Koenig | Aug. 3, 1948 |
| 2,457,703 | Merkel | Dec. 28, 1948 |
| 2,523,360 | Ellwood | Sept. 26, 1950 |
| 2,556,716 | Viol | June 12, 1951 |
| 2,691,147 | Sutton et al. | Oct. 5, 1954 |